United States Patent

Kobayashi

[11] Patent Number: 6,154,966
[45] Date of Patent: Dec. 5, 2000

[54] MANUAL CABLE CUTTER

[76] Inventor: Sadaichi Kobayashi, 1-7, Katsubogawa 2-chome, Sanjo-shi, Niigata-ken, Japan

[21] Appl. No.: 09/368,423

[22] Filed: Aug. 5, 1999

[51] Int. Cl.[7] .................................................... B26B 13/00
[52] U.S. Cl. ................................................................ 30/250
[58] Field of Search .............................. 30/250, 251, 198, 30/190; 81/314

[56] References Cited

U.S. PATENT DOCUMENTS

| | | | |
|---|---|---|---|
| 4,223,439 | 9/1980 | Rommel | 30/250 |
| 4,677,748 | 7/1987 | Kobayashi | 30/250 |
| 4,779,342 | 10/1988 | Kobayashi et al. | 30/250 |
| 5,218,768 | 6/1993 | Putsch et al. | 30/250 |

*Primary Examiner*—Douglas D. Watts
*Attorney, Agent, or Firm*—Wenderoth, Lind & Ponack, L.L.P.

[57] ABSTRACT

A manual cable cutter includes a pair of fixed and shaking handles joined mutually in the upper part sides thereof, a spring for urging the pair of handles in the expanding direction, a fixed cutting blade disposed continuously in the upper part of the fixed handle, a turning cutting blade having a row of teeth formed on its arcuate outer face and having a basal end part turnably supported on the leading end part of the fixed cutting blade, a holdback claw rotatably disposed in the upper part of the fixed handle and adapted to be meshed by the spring with the row of teeth, a feeding claw rotatably supported on the shaking handle and adapted to be meshed by the spring with the row of teeth, a switch device for switching the range of motion of the shaking handle between a first opening position during the course of cutting motion and a second opening position during the course of releasing motion, and a release lever rotatably formed on the fixed handle for retracting the holdback claw and the feeding claw synchronously from the row of teeth toward the upper part of the fixed handle and rotated with the shaking handle. The switch device is switched to sway the shaking handle to the second opening position to cancel the engagement of the holdback claw and the feeding claw with the row of teeth.

3 Claims, 6 Drawing Sheets

MANUAL CABLE CUTTER

BACKGROUND OF THE INVENTION

1. Field of the Invention

This invention relates to improvements in and concerning a manual cable cutter for cutting various cables, such as wire cables, electric cables, communication lines, and reinforcing bars.

2. Description of the Prior Art

Among the conventional cable cutters of this class is counted the cable cutter which is disclosed in U.S. Pat. No. 5,218,768.

The conventional cable cutter, though not specifically illustrated, is constructed by forming a pair of handles joined mutually in the upper part sides thereof and urged in the expanding direction by the spring action, assigning one of the pair of handles as a fixed handle and the other as a shaking handle, disposing a fixed cutting blade continuously in the upper part of the fixed handle and, at the same time, causing the basal end part of a turning cutting blade having a row of teeth formed on the arcuate outer face thereof to be turnably supported on the leading end part of the fixed cutting blade, disposing rotatably a holdback claw in the upper part of the fixed handle, causing the holdback claw to be meshed by the urging spring pressure with the outer row of teeth of the turning cutting blade, causing a feeding claw to be rotatably supported on the shaking handle, and similarly causing the feeding claw to be meshed by the urging spring pressure with the outer row of teeth of the turning cutting blade.

The actual use of the conventional cable cutter is attained by inserting a cable as a given workpiece into a vacant area formed between the turning cutting blade and the fixed cutting blade when they are opened, then guiding the free end part side of the turning cutting blade in the closing direction around the rotatable support mentioned above as a fulcrum, thereby encircling the periphery of the cable with the turning cutting blade and the fixed cutting blade, and subsequently taking hold of the pair of handles and imparting a closing motion continuously to the shaking handle. Each time the closing motion is imparted to the shaking handle, the turning cutting blade is made to continue an automatic rotational motion until the vacant area mentioned above decreases and reaches zero by the actions of idle slide and push produced by the feeding claw meshed with the outer row of teeth of the turning cutting blade. As a result, the cable is cut by the blade parts formed along the opposed edges of the turning cutting blade and the fixed cutting blade. During the process described above, the holdback claw like the feeding claw prevents the turning cutting blade from rotating reversely owing to the actions of idle slide and push exerted on the outer row of teeth of the turning cutting blade.

The cancellation of the engagement of the feeding claw and the holdback claw with the outer row of teeth of the turning cutting blade is attained by tentatively closing the fixed handle and the shaking handle until parallelism, retaining them in parallelism, and opening the shaking handle meanwhile rotating the holdback claw in the direction of cancelling the engagement thereof with the outer row of teeth against the urging spring pressure. As a result, the action of the holdback claw rotates the feeding claw likewise in the direction of cancelling the engagement thereof with the outer row of teeth. Thus, the turning cutting blade is enabled to be freely turned in the two opposite directions.

The work of cutting a varying metal cable, on account of the efficiency of the cutter and the hardness and diameter of the cable, often encounters such an unexpected accident that the turning cutting blade, in the process of generating a cutting motion, will fail to continue the rotational motion in the closing direction in spite of an ardent effort to impart a closing motion to the shaking handle. The cable cutter of this kind, therefore, requires a construction capable of promptly coping with this trouble, namely a construction capable of reversing the turning cutting blade in the opening direction and allowing easy removal of the cable in trouble.

The conventional cable cutter theoretically ought to answer the requirement because the turning cutting blade is enabled to move backward by cancelling the engagement of the holdback claw and the feeding claw with the outer row of teeth of the turning cutting blade.

In the conventional cable cutter, however, the cancellation of the engagement of the holdback claw and the feeding claw with the outer row of teeth must be preceded by the closure of the fixed handle and the shaking handle until parallelism. When the shaking handle is accidentally frozen in its opened state, the fixed handle and the shaking handle can no longer be closed toward each other. In this case, therefore, the requirement mentioned above cannot be answered because the engagement of the holdback claw and the feeding claw with the outer row of teeth of the turning cutting blade cannot be cancelled.

This invention, having originated in the appreciation of such problems as are encountered by the conventional manual cable cutter, has for a primary object thereof the provision of a novel manual cable cutter which enables the holdback claw and the feeding claw to be simply and infallibly retracted from the outer row of teeth of the turning cutting blade.

SUMMARY OF THE INVENTION

To accomplish this object, the present invention provides a manual cable cutter comprising: a pair of fixed and shaking handles joined mutually in upper part sides thereof; a spring for urging the pair of handles in an expanding direction; a fixed cutting blade disposed continuously in an upper part of the fixed handle; a turning cutting blade having a row of teeth formed on an arcuate outer face thereof and having a basal end part turnably supported on a leading end part of the fixed cutting blade; a holdback claw rotatably disposed in an upper part of the fixed handle and adapted to be meshed by the spring with the row of teeth of the turning cutting blade; a feeding claw rotatably supported on the shaking handle and adapted to be meshed by the spring with the row of teeth of the turning cutting blade; a switch means for switching a range of motion of the shaking handle between a first opening position during a course of cutting motion and a second opening position during a course of releasing motion; and a release lever rotatably formed on the fixed handle for retracting the holdback claw and the feeding claw synchronously from the row of teeth of the turning cutting blade toward the upper part of the fixed handle and rotated with the shaking handle; whereby a switch of the switch means sways the shaking handle to the second opening position to cancel the engagement of the holdback claw and the feeding claw with the row of teeth of the turning cutting blade.

The objects, features, and characteristics of this invention other than those set forth above will become apparent from the description given in detail hereinbelow with reference to one preferred embodiment illustrated in the accompanying drawings.

DETAILED DESCRIPTION OF THE PREFERRED EMBODIMENT

Figure 1:
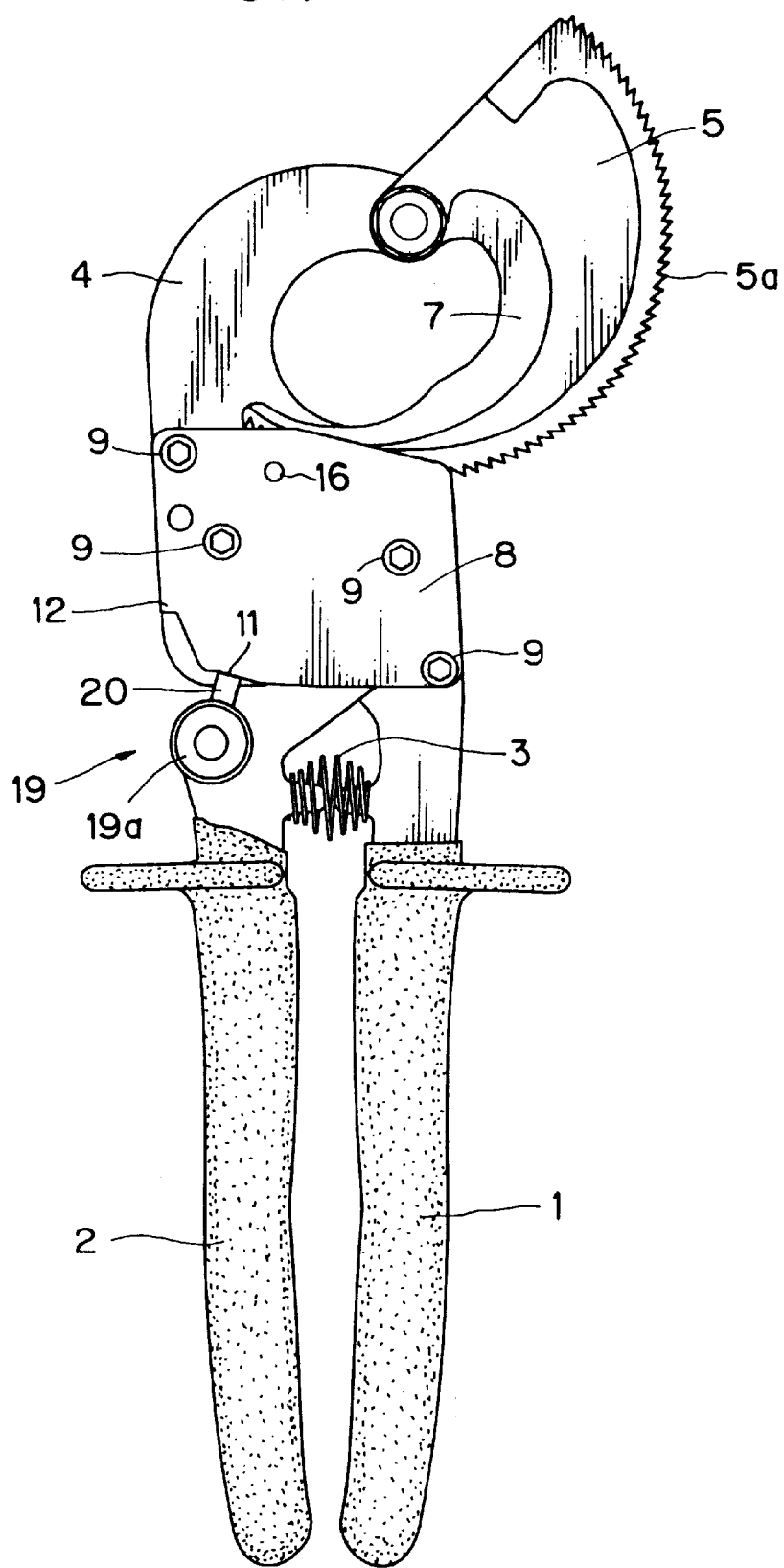
FIG. 1 is a front view of a manual cable cutter according to one embodiment of this invention.
Figure 2:
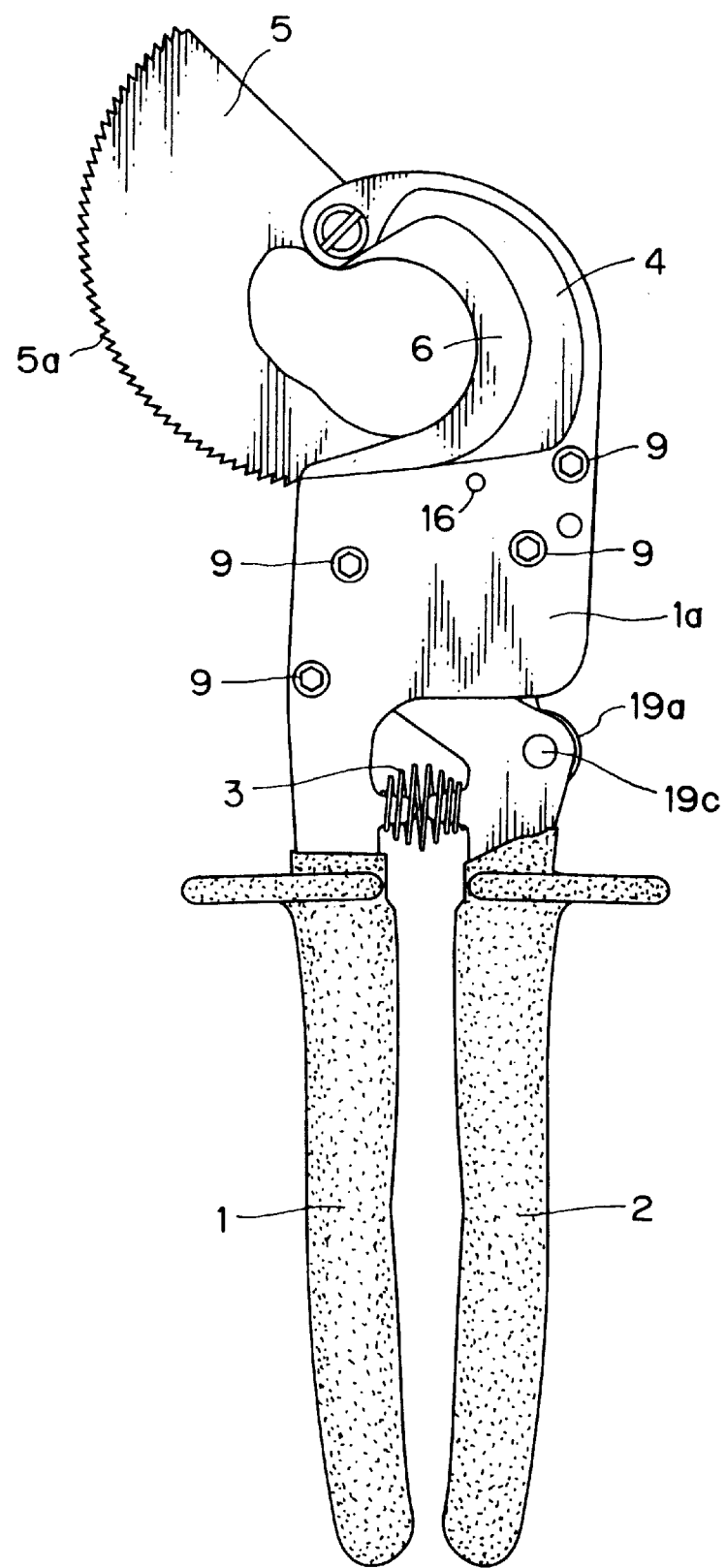
FIG. 2 is a rear view of the same cable cutter.
Figure 3:
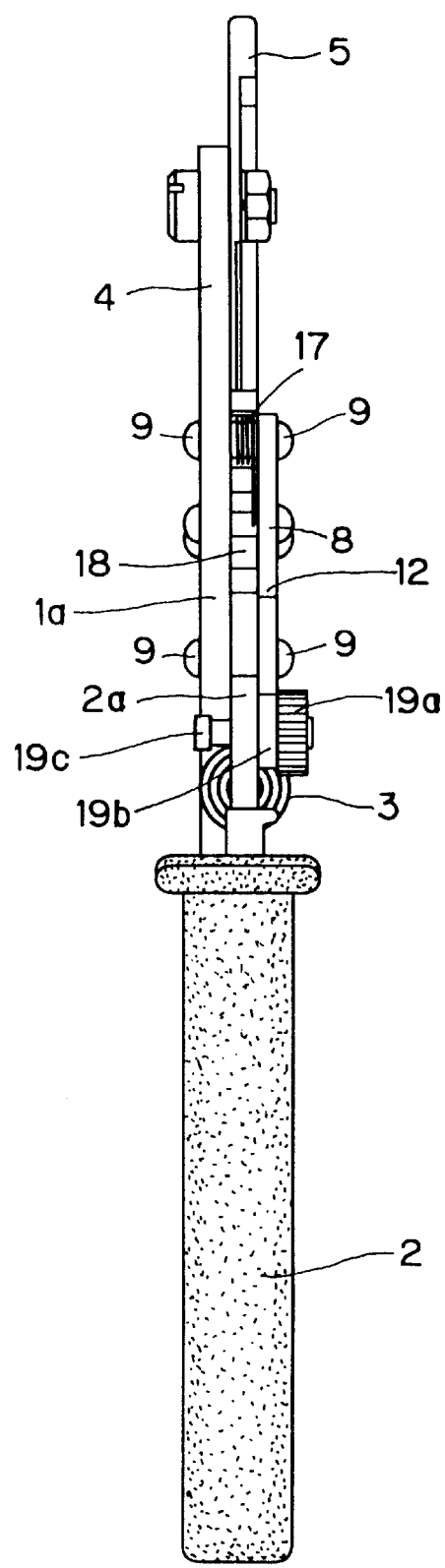
FIG. 3 is a side view of the same cable cutter.

Now, this invention will be described in detail below based on a preferred embodiment illustrated. The manual cable cutter according to the embodiment, as illustrated in FIG. 1 through FIG. 3, is constructed by forming a pair of fixed and shaking handles 1 and 2 urged in the expanding direction by the spring action of a drum spring 3, disposing a fixed cutting blade 4 continuously in the large-width upper part 1a of the fixed handle I and, at the same time, causing the basal end part of a turning cutting blade 5 having a row of teeth 5a formed continuously on the arcuate outer face thereof to be turnably supported on the leading end part of the fixed handle 1, and thereby enabling a cable (not shown) kept in a state completely enclosed with the turning cutting blade 5 and the fixed cutting blade 4 to be cut with a receiving blade part 6 and a pushing blade part 7 formed along the opposed edges of the cutting blades 4 and 5.

The upper front face sides of the fixed handle and the shaking handle 2 are concealed with a substantially rectangular cover plate 8. The cover plate 8 and the large-width upper part 1a of the fixed handle 1 are fixed with a fixed empty space using screw members 9 and tubular collars 10 (FIG. 4) having a female thread formed on the inner wall thereof. The pair of handles 1 and 2 are locked in a mutually closed state by providing the cover plate 8 at the lower edge of one side thereof with a notched engaging part 11 and establishing engagement between a projecting piece 20 of a switching pin 19 which will be described more specifically hereinbelow and the engaging part 11 mentioned above. The shaking handle 2 is allowed to sway only to a first opening position P1 (FIG. 4) and restricted from making any further sway by disposing a similarly notched stopper part 12 on one side edge of the cover plate 8 and, during a normal cutting operation, allowing the peripheral face of the switching pin 19 to collide against the stopper part 12.

Figure 4:
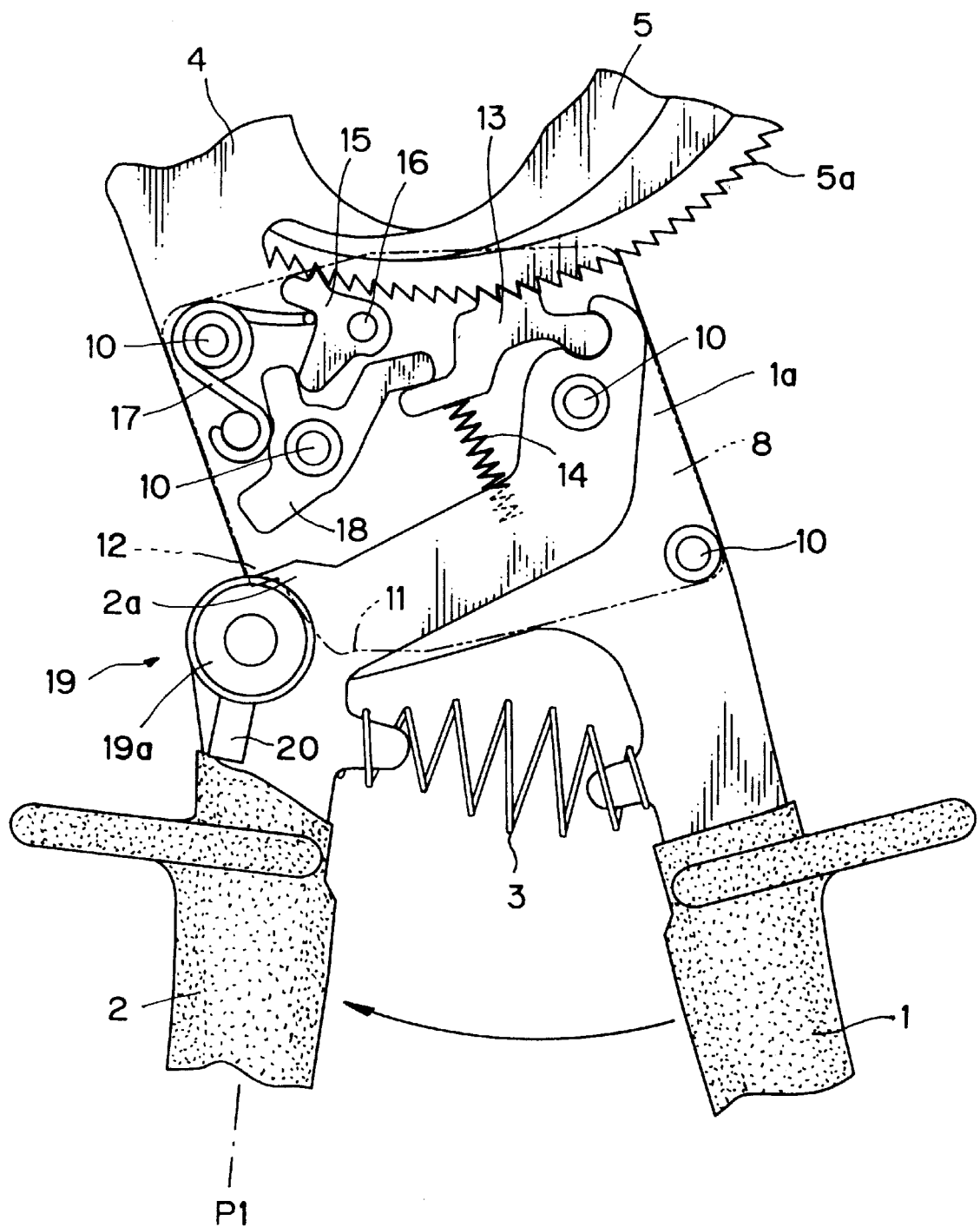
FIG. 4 is a magnified explanatory diagram of the essential part of the cable cutter illustrating the state of engagement of a feeding claw and a holdback claw with an outer row of teeth of a turning cutting blade.

The present embodiment is so constructed as to support shakably the upper end part of the shaking handle 2 by utilizing one of the tubular collars 10 as illustrated in FIG. 4 with respect to the empty scape defined between the large-width upper part 1a of the fixed handle and the cover plate 8 and, at the same time, cause a feeding claw 13 to engage with the outer row of teeth 5a of the turning cutting blade 5 with the urging spring pressure of a compression coil spring 14 by rotatably supporting the feeding claw 13 in the upper end part of the shaking handle 2 and meanwhile cause a holdback claw 15 to be engaged with the outer row of teeth 5a of the turning cutting blade 5 by virtue of the urging spring pressure of a torsion coil spring 17 by rotatably disposing the holdback claw 15 in the proximity of the feeding claw 13 through an axis 16.

Further, it is so constructed as to dispose rotatably a release lever 18 capable of forcibly retracting the holdback claw 15 and the feeding claw synchronously from the outer row of teeth 5a of the turning cutting blade 5 in the proximity of the feeding claw 13 and the holdback claw 15 by similarly utilizing one of the tubular collars 10 and, at the same time, mounting rotatably and slidably the switching pin 19 in a through hole formed in a folding part 2a of the shaking handle 2 approximating closely to the release lever 18.

Figure 5A:
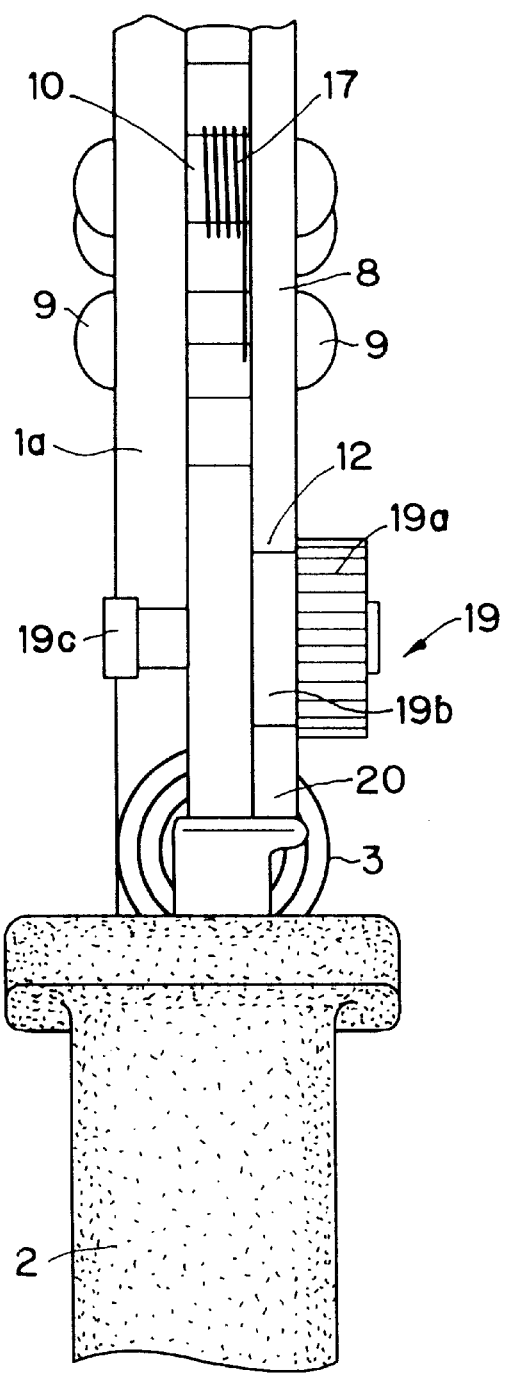
FIG. 5(A) is a magnified explanatory diagram of the essential part of the cable cutter illustrating the state in which a switching pin is driven home in the direction of the upper part of large width of a fixed handle.
Figure 5B:
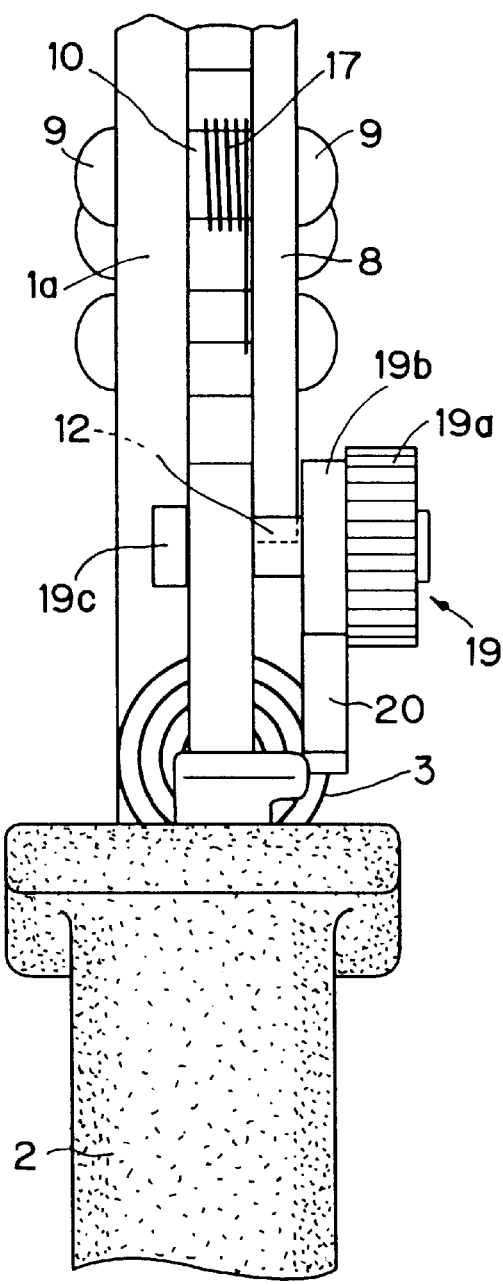
FIG. 5(B) is a magnified explanatory diagram of the essential part of the cable cutter illustrating the state in which the switching pin is pulled up in the direction of a cover plate.

The switching pin 19 is integrally provided on one end part side thereof with a large-diameter disc part 19a fated to serve as an operating part and a small-diameter disc part 19b (FIG. 5) forming the projecting piece 20 thereon. During the course of a normal cutting motion, the shaking handle 2 is allowed to sway as far as the first opening position P1 (FIG. 4) by keeping the switching pin 19 forced down toward the large-width upper part 1a of the fixed handle as illustrated in FIG. 5(A) and consequently enabling the small-diameter disc part 19b to collide against the stopper part 12 of the cover plate 8 as already described. When the switching pin 19 is conversely pulled up from the cover plate 8, the shaking handle 2 is allowed to sway as far as a second opening position P2 (FIG. 6) past the first opening position P1 because the small-diameter disc part 19b no longer collides against the stopper part 12 of the cover plate 8 as illustrated in FIG. 5(B). On the other end part side of the switching pin 19, a swelled part 19c for preventing accidental dislocation of the switching pin 19 is formed.

Actual use of the manual cable cutter constructed as described above for cutting a varying metal cable (not shown) is effected by first setting the switching pin 19 depressed toward the large-width upper part 1a of the fixed handle 1 [FIG. 5(A)], inserting the cable into the vacant area defined between the turning cutting blade 5 and the fixed cutting blade 4 which are pened, then guiding the free end part of the turning cutting lade 5 to the interval between the cover plate 8 and the arge-width upper part 1a of the fixed handle 1, enclosing the able completely with the turning cutting blade 5 and the fixed cutting blade 4, and thereafter taking hold of the pair of andles and imparting a closing motion to the shaking handle 2. Each time the closing motion is imparted to the shaking handle 2, the turning cutting blade 5 is made to continue an automatic rotational motion until the vacant area mentioned above decreases and reaches zero by the actions of idle slide and push produced by the feeding claw 13 meshed with the outer row of teeth 5a of the turning cutting blade 5. As a result, the cable is cut by the pushing and receiving blade parts 7 and 6 formed along the opposed edges of the turning cutting blade 5 and the fixed cutting blade 4. During the process described above, the holdback claw 15 like the feeding claw 13 prevents the turning cutting blade 5 from rotating reversely owing to the actions of idle slide and push exerted on the outer row of teeth 5a of the turning cutting blade 5.

Figure 6:
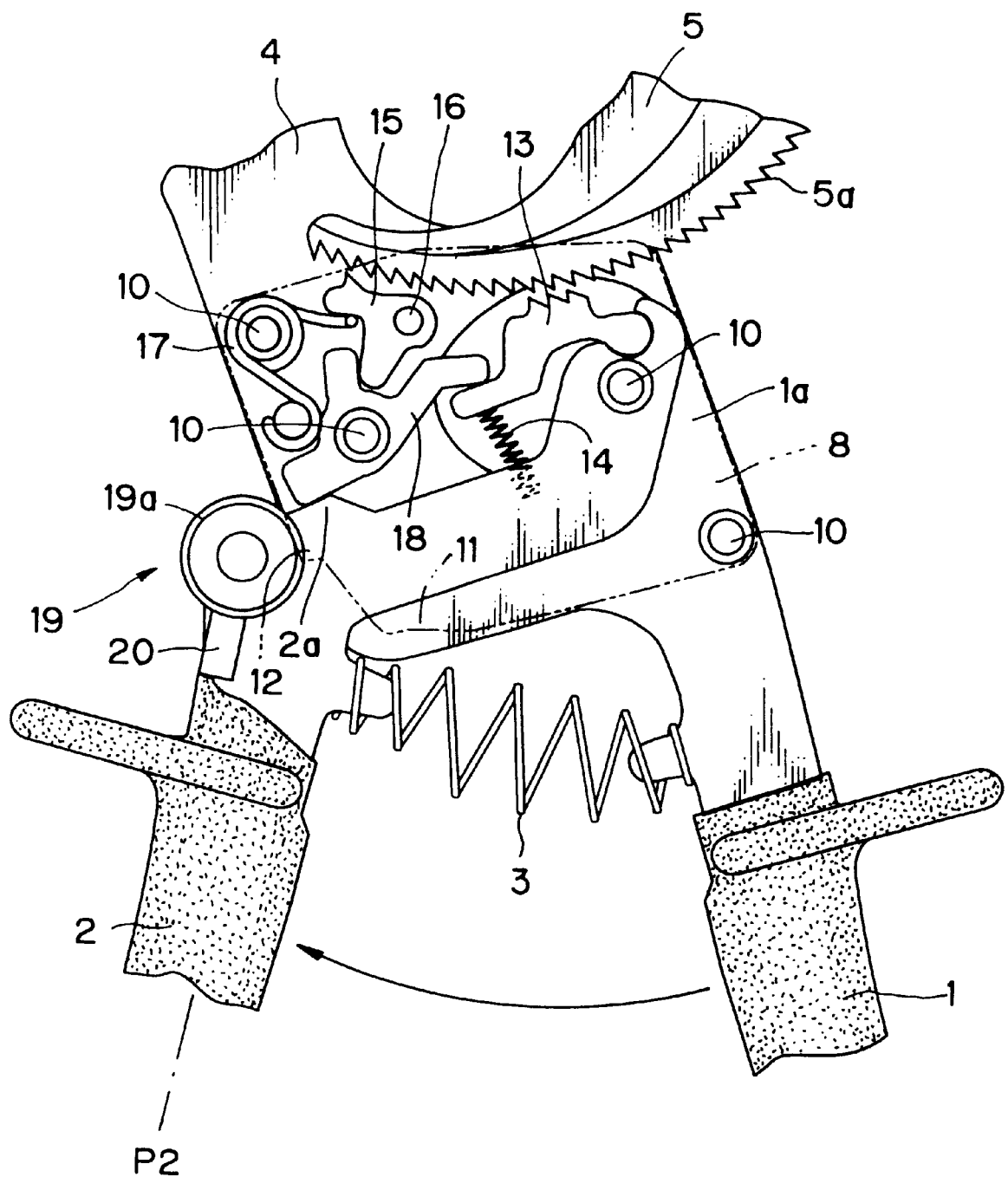
FIG. 6 is a magnified explanatory diagram of the essential part of the cable cutter illustrating the state in which the feeding claw and the holdback claw are extracted from the outer row of teeth of the turning cutting blade.

When the manual cable cutter develops trouble in the process of cutting a cable and the turning cutting blade 5 consequently becomes incapable of producing a rotational motion in the closing direction, the shaking handle 2 is enabled to sway as far as the second opening position P2 past the first opening position P1 by setting the switching pin 19 pulled up from the cover plate 8 [FIG. 5(B)] and consequently precluding collision between the small-diameter disc part 19*b* and the stopper part 12 of the cover plate 8. Thereafter, when the paired handles 1 and 2 are gripped respectively in both hands and the shaking handle 2 is swayed fully to the second opening position P2, then the folding part 2*a* of the shaking handle 2 will collide against the release lever 18 and push up the release lever 18 as illustrated in FIG. 6 and, as a consequence, the release lever 18 will rotate clockwise and induce retraction of the feeding claw 13 and the holdback claw 15 from the outer row of teeth 5*a* of the turning cutting blade 5 against their own urging spring pressures. Now, the cable in trouble is easily removed from the manual cable cutter by forcibly moving the turning cutting blade 5 in the opening direction.

Thus, the cable cutter according to the present embodiment, unlike the conventional cable cutter, has absolutely no need for closing the pair of handles 1 and 2 preparatorily to the cancellation of the engagement of the feeding claw 13 and the holdback claw 15 with the outer row of teeth 5*a* of the turning cutting blade 5. Even when the cable cutter happens to develop trouble during the course of cutting a cable and the shaking handle 2 is consequently frozen in its opened state, for example, perfect elimination of this trouble can be effected by simply opening the shaking handle 2 to the second opening position P2 and consequently enabling the turning cutting blade 5 to reverse instantly.

When the manual cable cutter of this invention, on account of the efficiency of the cutter and the hardness and diameter of the cable, encounters such an unexpected accident that the turning cutting blade in the process of generating a cutting motion will fail to continue the rotational motion in the closing direction in spite of an ardent effort to impart a closing motion to the shaking handle, this invention owing to the adoption of the construction described above enables the cable in trouble to be easily removed from the manual cable cutter by forcibly moving the turning cutting blade in the opening direction because the engagement of the holdback claw and the feeding claw with the outer row of teeth of the turning cutting blade can be instantly cancelled through the release lever by actuating the switch means and enabling the shaking handle to swing from the first opening position for the process of cutting to the second opening position for the process of releasing and thereafter making the shaking handle to swing to the second opening position.

What is claimed is:

1. A manual cable cutter comprising:

a pair of fixed and shaking handles joined mutually in upper part sides thereof;

a spring for urging the pair of handles in an expanding direction;

a fixed cutting blade disposed continuously in an upper part of the fixed handle;

a turning cutting blade having a row of teeth formed on an arcuate outer face thereof and having a basal end part turnably supported on a leading end part of the fixed cutting blade;

a holdback claw rotatably disposed in an upper part of the fixed handle and adapted to be meshed by the spring with the row of teeth of the turning cutting blade;

a feeding claw rotatably supported on the shaking handle and adapted to be meshed by the spring with the row of teeth of the turning cutting blade;

a switch means for switching a range of motion of the shaking handle between a first opening position during a course of cutting motion and a second opening position during a course of releasing motion; and a release lever rotatably formed on the fixed handle for retracting the holdback claw and the feeding claw synchronously from the row of teeth of the turning cutting blade toward the upper part of the fixed handle and rotated with the shaking handle;

whereby a switch of the switch means sways the shaking handle to the second opening position to cancel the engagement of the holdback claw and the feeding claw with the row of teeth of the turning cutting blade.

2. A manual cable cutter according to claim 1, wherein the switch means is composed of a switching pin mounted rotatably and slidably on the shaking handle and a stopper part of a cover plate disposed on upper front face sides of the fixing handle and the shaking handle.

3. A manual cable cutter according to claim 2, wherein the switching pin is provided with a disc part and is adapted to allow the shaking handle to sway to the first opening position when the switching pin is depressed in a direction toward the fixed handle to allow the disc part thereof to collide against the stopper part of the cover plate, and then allow the shaking handle to sway to the second opening position past the first opening position when the switching pin is pulled up from the fixed handle to allow the disc part to avoid colliding with the stopper part of the cover plate.

* * * * *